United States Patent
Aho, Jr. et al.

(10) Patent No.: US 8,272,644 B1
(45) Date of Patent: Sep. 25, 2012

(54) FLOATING CARD SEAL

(75) Inventors: Wilho V Aho, Jr., West Palm Beach, FL (US); Jack W Wilson, Jr., Palm Beach Gardens, FL (US); Vincent P Laurello, Hobe Sound, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 323 days.

(21) Appl. No.: 12/835,107

(22) Filed: Jul. 13, 2010

Related U.S. Application Data

(60) Provisional application No. 61/225,456, filed on Jul. 14, 2009.

(51) Int. Cl.
*F16J 15/44* (2006.01)
(52) U.S. Cl. ............................................ 277/355
(58) Field of Classification Search ............ 277/355
See application file for complete search history.

(56) References Cited

U.S. PATENT DOCUMENTS

| | | | |
|---|---|---|---|
| 6,267,381 B1 | 7/2001 | Wright | |
| 6,343,792 B1 | 2/2002 | Shinohara et al. | |
| 6,736,597 B2 | 5/2004 | Uehara et al. | |
| 6,874,788 B2 | 4/2005 | Kono | |
| 7,201,378 B2 | 4/2007 | Kono | |
| 7,261,515 B2 | 8/2007 | Nishimoto et al. | |
| 7,419,164 B2 | 9/2008 | Awtar et al. | |
| 7,487,588 B2 | 2/2009 | Hogg et al. | |
| 7,651,101 B2 | 1/2010 | Awtar et al. | |
| 7,703,774 B2 | 4/2010 | Awtar et al. | |
| 7,743,498 B2 | 6/2010 | Rhodes | |
| 7,744,092 B2 | 6/2010 | Mortzheim | |
| 2004/0232621 A1* | 11/2004 | Kono | 277/355 |
| 2006/0061040 A1* | 3/2006 | Nicholson et al. | 277/355 |
| 2007/0018408 A1* | 1/2007 | Kono | 277/355 |
| 2007/0102886 A1* | 5/2007 | Uehara et al. | 277/355 |
| 2007/0120326 A1* | 5/2007 | Rhodes et al. | 277/355 |
| 2008/0007008 A1* | 1/2008 | Hoebel et al. | 277/355 |
| 2008/0007009 A1* | 1/2008 | Williams | 277/355 |
| 2008/0099999 A1* | 5/2008 | Williams | 277/355 |

\* cited by examiner

*Primary Examiner* — Vishal Patel
(74) *Attorney, Agent, or Firm* — John Ryznic

(57) ABSTRACT

A card seal with an annular arrangement of leaf elements, where each leaf element has a T shape with an upper ear section and a leaf section extending from the ear section. the leaf elements each include a first raised portion and a second raised portion that form a cross, the raised portions allowing for air to pass to bend ends on the leaf sections to form a floating air seal and to limit leakage flow across the leaf elements from one side to the opposite side.

2 Claims, 10 Drawing Sheets

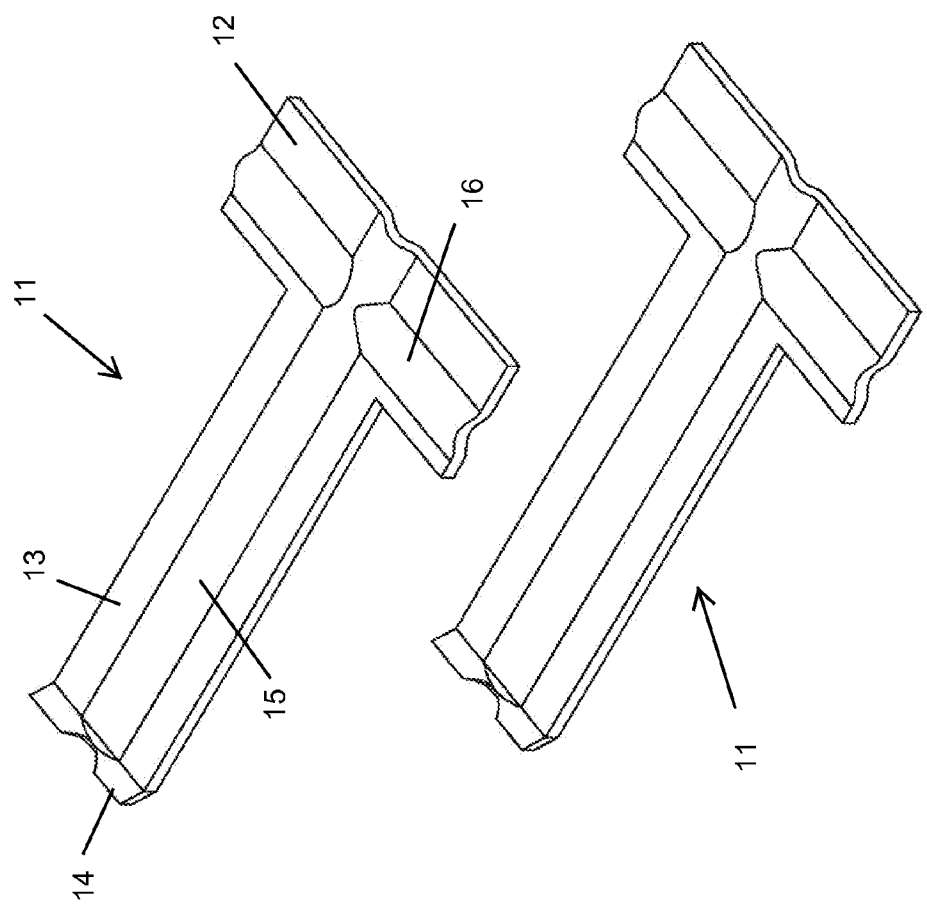

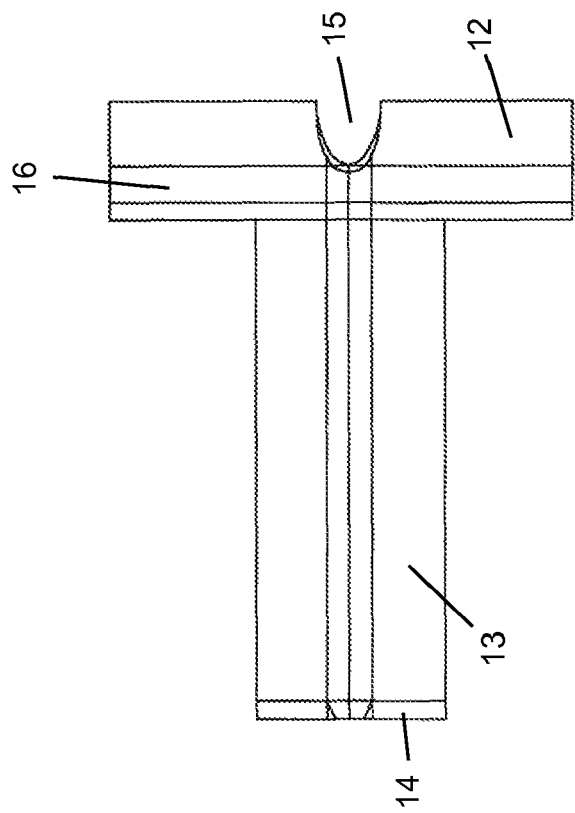
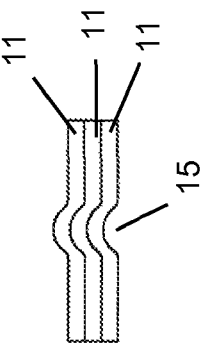
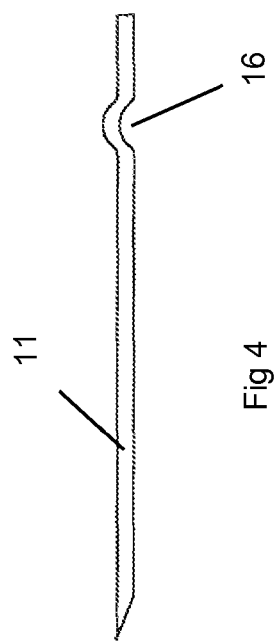
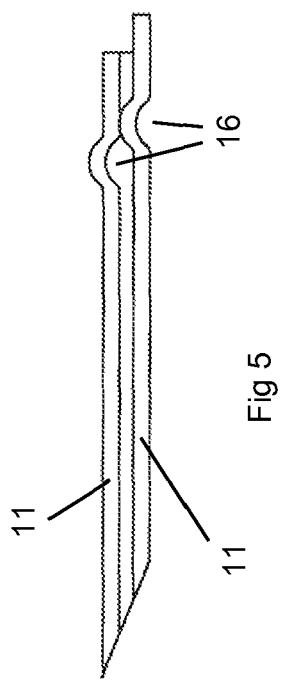

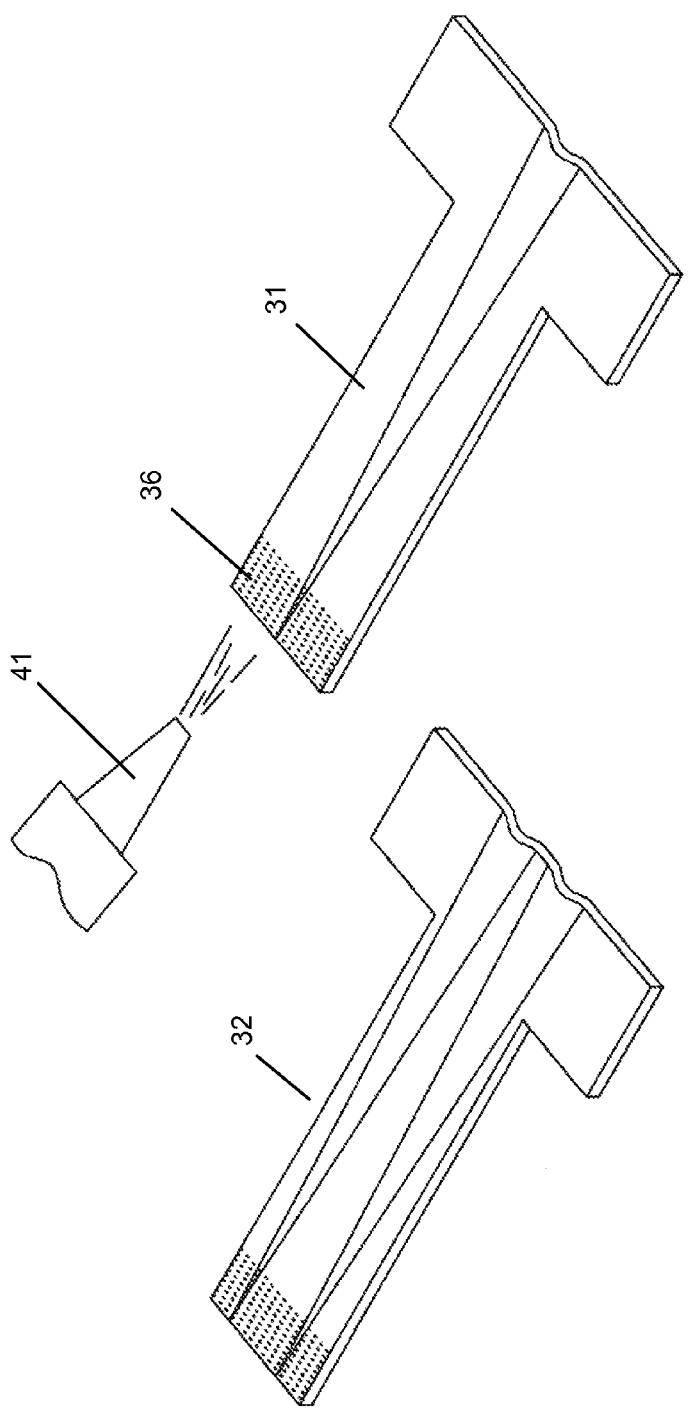

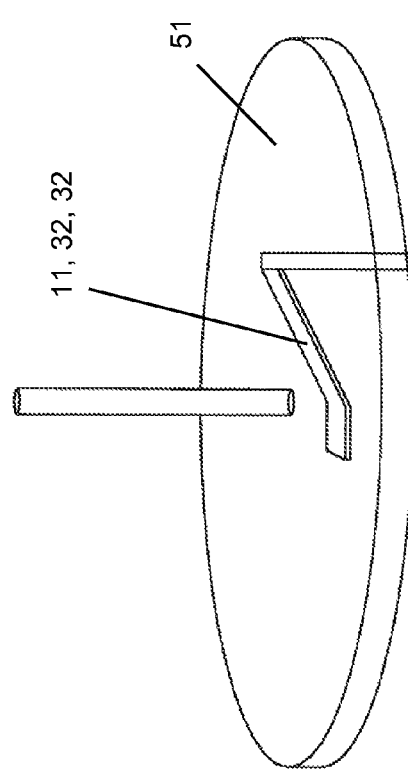
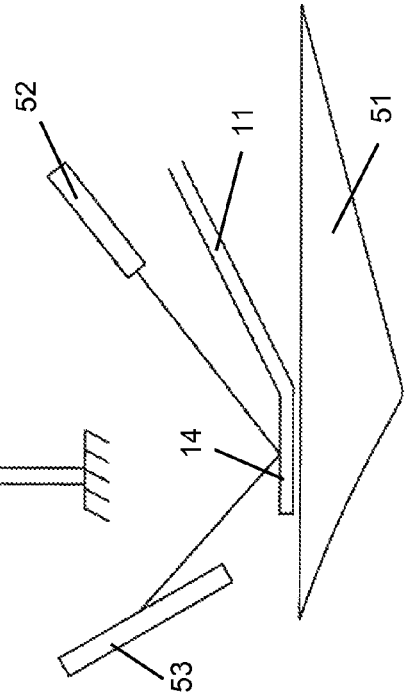

FLOATING CARD SEAL

CROSS-REFERENCE TO RELATED APPLICATIONS

This application claims the benefit to U.S. Provisional Patent Application 61/225,456 filed on Jul. 14, 2009 and entitled FLOATING CARD SEAL.

FEDERAL RESEARCH STATEMENT

None.

BACKGROUND OF THE INVENTION

1. Field of the Invention

The present invention relates generally to a rotary machine, and more specifically to a method and an apparatus for sealing a rotary machine.

2. Description of the Related Art including information disclosed under 37 CFR 1.97 and 1.98

In an industrial gas turbine engine, rotary seals are required to provide a seal between a rotating part (the rotor) and a stationary part (the stator) of the engine and prevent a hot gas flow from passing through to temperature sensitive areas and to prevent leakage of the hot gas in order to increase the efficiency of the engine. Labyrinth seals or brush seals have been widely used in these engines but have limitations. Brush seals will wear relatively easily due to a constant rubbing of the brush ends on the rotating surface that forms the seal surface. Brush seals make good low rotation speed seals. The labyrinth or lab seals provide good sealing at higher rotational speeds without rubbing, but provide high leakages at lower rotational speeds because of a gap formed between the ends of the lab seal teeth or fingers and the stationary part of the casing or housing that forms the seal interface for the brush lab seal. In some cases, the lab seals are designed to rub against a honeycomb structure to provide an even lower leakage flow across the lab seal.

Prior art card seals include an annular arrangement of leaf plates that are stacked on top of one another, where one end of each leaf plate is secured to the seal casing while the opposite end rides on and over a rotating surface such as a rotor shaft in which the seal is to be formed. The card seals are made such that the leaf plates can have a slight pivot about the top end that is secured to the seal casing, the slight pivoting allowing for play during operation of the card seal. The prior art leaf plates are flat surfaces and form a small controlled air gap between adjacent leaf plates. Card seals are like a combination of labyrinth seals and brush seals combined into one seal. Because an upstream side of the card seal is at a higher pressure than the downstream side, the pressure differential can force leakage through the leaf plates because of any gap formed between adjacent leaf plates. When all of the gaps for all of the annular arrangement of leaf plates are counted, a large leakage flow is formed across the card seal.

U.S. Pat. No. 6,736,597 B2 issued to Uehara et al. on May 18, 2004 and entitled AXIS SEAL MECHANISM AND TURBINE and U.S. Pat. No. 6,874,788 B2 issued to Kono on Apr. 5, 2005 and entitled STRIP BUSH SEAL discloses prior art card seals in which the leaf elements are just plane flat pieces stacked one on top of another to form a full 360 degree annular arrangement of leafs around a shaft. Because the leaf elements are flat, any small space formed between adjacent leaf elements will provide for a direct fluid leakage path from one side of the leaf elements to the opposite side.

BRIEF SUMMARY OF THE INVENTION

A floating card seal made up of a number of leaf elements that have raised section for passage of a fluid such as air that will provide for a floating leaf element to form a floating card seal. The raised portions also form an obstruction to fluid leakage across the card seal where fluid would pass through adjacent leaf elements. The leaf elements of the card seal includes ends that are bent to form a floating seal forming surface so that the leaf elements will float above the surface instead of making contact therewith.

The leaf elements are T-shaped with a top end of the T being secured to a stationary casing of the card seal and the leaf element extending down from the T end toward the surface that the card seal rides over. In one embodiment, all of the leaf elements have the same shape and form. In another embodiment, two different shaped leaf elements are stacked in an alternating manner so that raised portions on the leaf elements do not directly line up but alternate from one leaf element to the next leaf element.

In another embodiment of the present invention, a process for treating the tip ends of the leaf elements for surface enhancement to reduce wear in a hard rub of the leaf section tip ends. A sand blaster is used to project etched glass beads coated with a dry lubricant to force the dry lubricant into the surface of the tip ends. This process is used on all of the leaf elements that form the annular arrangement of leaf elements that form the floating card seal. Any wear of the dry lubricant releases more dry lubricant. The dimples with impede the leakage.

In another embodiment, a process for testing card seal to quantify an air ride liftoff of the floating card seals of the present invention is disclosed. The process includes placing one of the leaf elements onto a turntable rotor such that the leaf element is fixed and the rotor rotates over the leaf element tip end floating surface. With the leaf element riding on the smooth surface of the turntable rotor, a laser directs a laser beam against a surface of the floating tip end of the leaf element that reflects the laser beam toward a photo pickup that will measure the angle $\theta$ in order to determine when a liftoff of the leaf element over the turntable rotor has occurred.

BRIEF DESCRIPTION OF THE SEVERAL VIEWS OF THE DRAWINGS

FIG. 3 shows an isometric view of two of the card seals of the first embodiment of the present invention.

FIG. 4 shows a side view of one of the card seals of the first embodiment of the present invention.

FIG. 5 shows a cross section side view of two of the card seals stacked together of the first embodiment of the present invention.

FIG. 6 shows a front view of the stack of card seals of the FIG. 5 card seal arrangement.

FIG. 7 shows a top view of one of the card seals of the first embodiment of the present invention.

FIGS. 14 and 15 show isometric views of two of the card seals of the second embodiment with surface enhancement to reduce wear during hard rubbing of the seal tips.

FIG. 16 shows a cross section side view of a leaf element of the card seal with a wear enhancement coating.

FIGS. 17-19 show a process to quantify air ride liftoff of the card seals of the present invention.

DETAILED DESCRIPTION OF THE INVENTION

Figure 2:
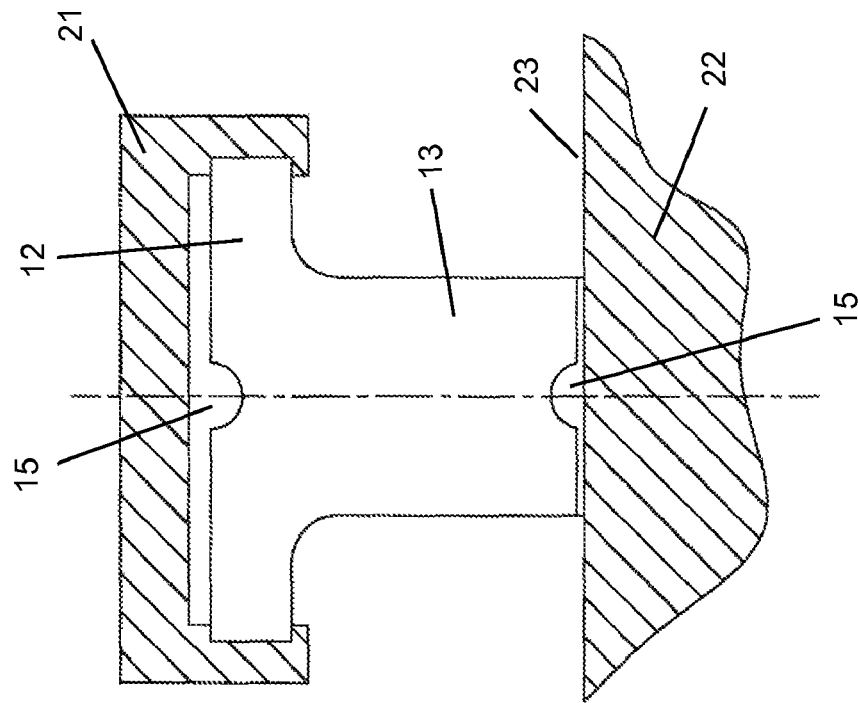
FIG. 2 shows a front view of the card seals of FIG. 1 of the present invention.

The present invention is an axial seal for a large turbo-machine, such as an industrial gas turbine engine, in which an axial seal is needed between a rotating part and a stationary part of the turbo-machine. The axial seal is intended to be an improvement in the type of seals that normally use brush seals or labyrinth seals to provide a seal against leakage of a hot gas flow through the turbo-machine. The turbo-machine of the present invention is a large frame heavy duty industrial gas turbine engine. However, the present invention is not limited to IGT engines, but could be used in an aero engine or even a steam turbine or a compressor in which the prior art labyrinth seals or brush seals are used.

FIG. 3 shows a view of two of the leaf elements 11 that, when stacked up, for a card seal of the present invention. Each leaf element 11 includes an ear section 12 and a leaf section 13 that extends from a middle of the ear section 12. The leaf element 11 forms a cross and includes flow channels 15 and 16 in both the leaf section 13 and the ear section 12. The flow channels are punched formed sections formed in the middle of these sections that form not flat surfaces on the flat ear and leaf sections 12 and 13. The leaf elements 11 are punch and die stamped to form the finished element 11. Also formed on the end of the leaf section 13 is a floating seal forming surface 14 that is bent upward from the flat surface of the leaf section 13 and includes a rounded out section in the middle and substantially aligned with the bended section of the leaf section 13.

Figure 1:
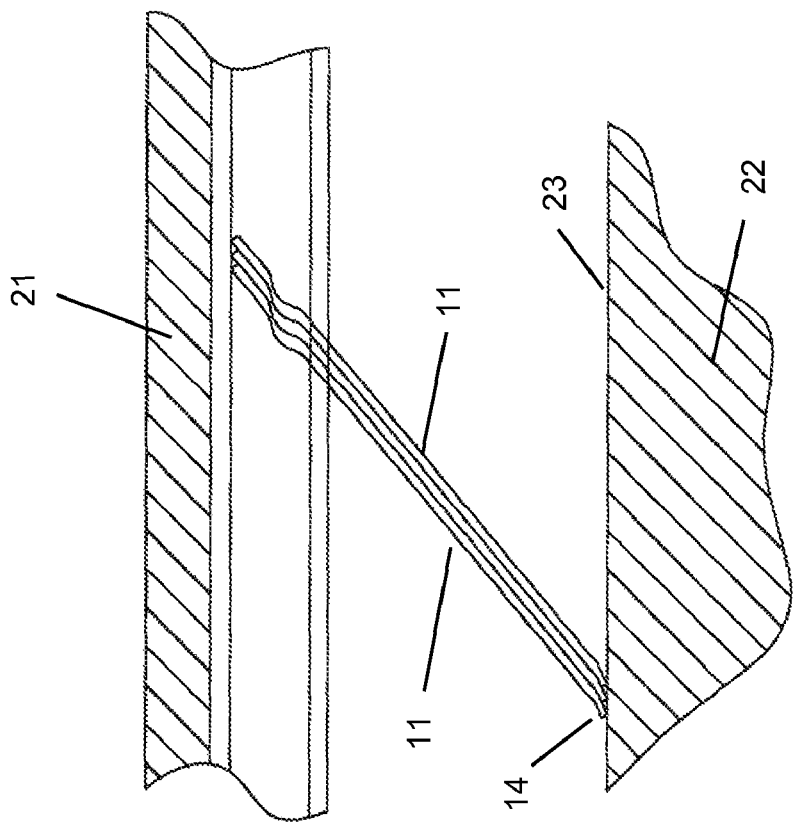
FIG. 1 shows a cross section side view of a stack of card seals of a first embodiment of the present invention.

The floating card seal of the present invention is formed by stacking a number of the leaf elements 11 one on top of each other in a complete annular arrangement around the rotating part in which the seal is formed. FIG. 1 shows a side view of three of the leaf elements 11 stacked on top of each other and extending from the stator 21 and in which the ends 14 of the leaf elements 13 ride over a smooth surface 23 of the rotor 22. FIG. 2 shows a front view of the card seal arrangement of FIG. 1 in which the ear section 12 of the leaf element 11 is secured in annular grooves that are formed in the stator 21 to hold the number of leaf elements 11 that form the complete seal. The leaf section 13 extends from a middle of the ear section 12 and rides on the smooth surface 23 of the rotor 22. Rounded sections 15 are seen in FIG. 2 that are formed by the bended sections of the leaf and ear sections. The bent ends 14 of each leaf section forms an air riding surface for the leaf elements 11 so that the surfaces of the leaf element 11 and the rotor smooth surface 23 do not rub during operation of the floating card seal of the present invention. The raised channels 15 and 16 form flow channels for the fluid used to produce the air ride if needed.

Normal rotation of the leaf elements over the smooth surface of the rotor should be enough to produce the air riding or floating effect. However, to enhance the air riding effect, a compressible fluid such as air can be supplied through the flow channels 15 and 16 formed between adjacent leaf elements 11 to enhance or produce the air riding effect or floating effect of the floating card seal assembly. The flow channel forming surfaces of the leaf elements 11 also form parasitic leakage blocking members of the leaf elements to prevent leakage across the sides of the stacked leaf elements that form the card seal.

FIG. 4 shows a single leaf element 11 with a flow channel formed by the raised portion 16 in the ear section 12. FIG. 5 shows two leaf elements 11 stacked on top of each other and FIG. 6 shows a front view of the stacked leaf elements 11 with the raised portions forming the flow channel 15 down the middle of the leaf section 13. FIG. 7 shows a top view of the leaf element 11 with the ear section 12 and the leaf section 13 with the locations of the raised portions 15 and 16 in both of the leaf and ear sections that form the flow paths for the fluid that enhances or forms the floating air riding capability of the floating card seal assembly. The slanted end 14 of the leaf section 13 is shown that forms the air riding surface.

The ear sections 12 of the leaf elements 11 can also be used to tune the spring by changing the ear 12 lengths or width together with the length of the leaf section 13 of the leaf element 11.

Figure 8:
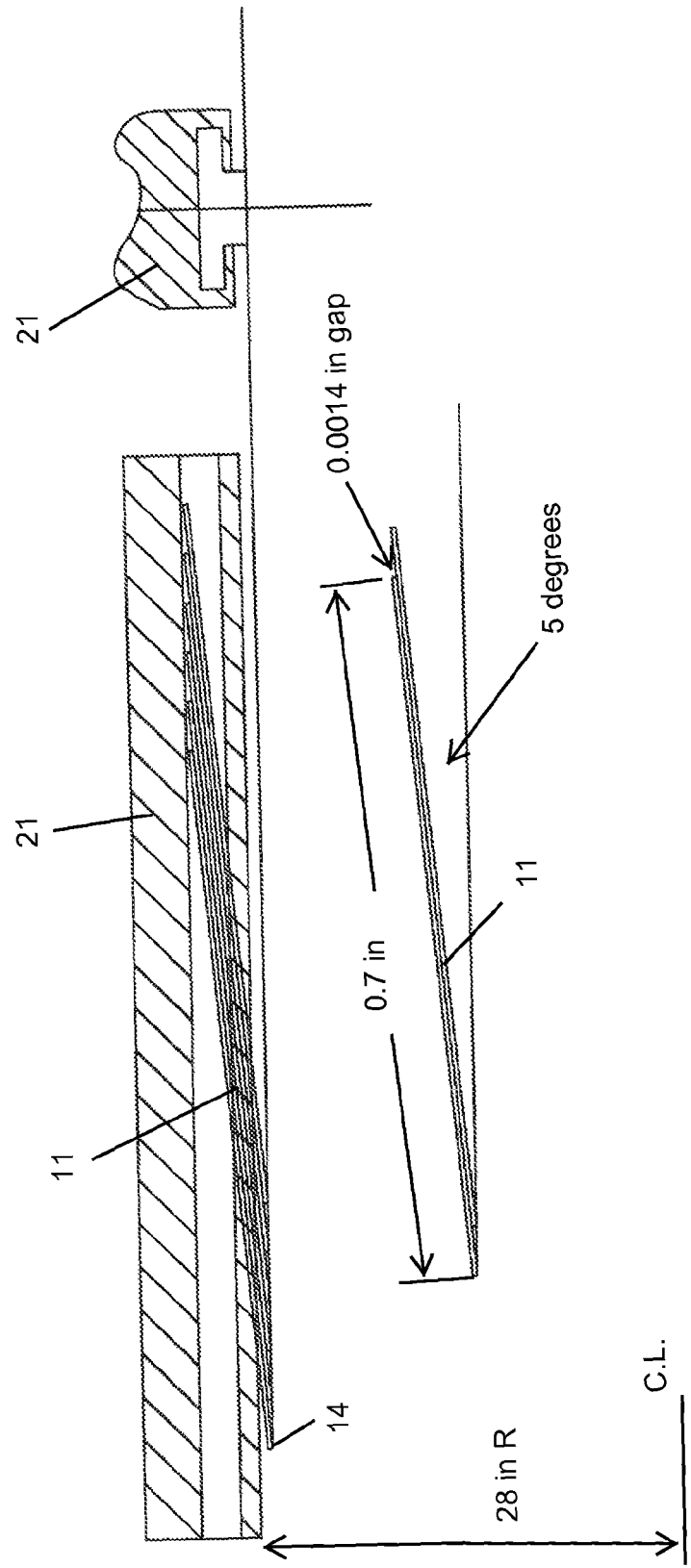
FIG. 8 shows a cross section side view of a stack of card seals of a second embodiment of the present invention.
Figure 9:
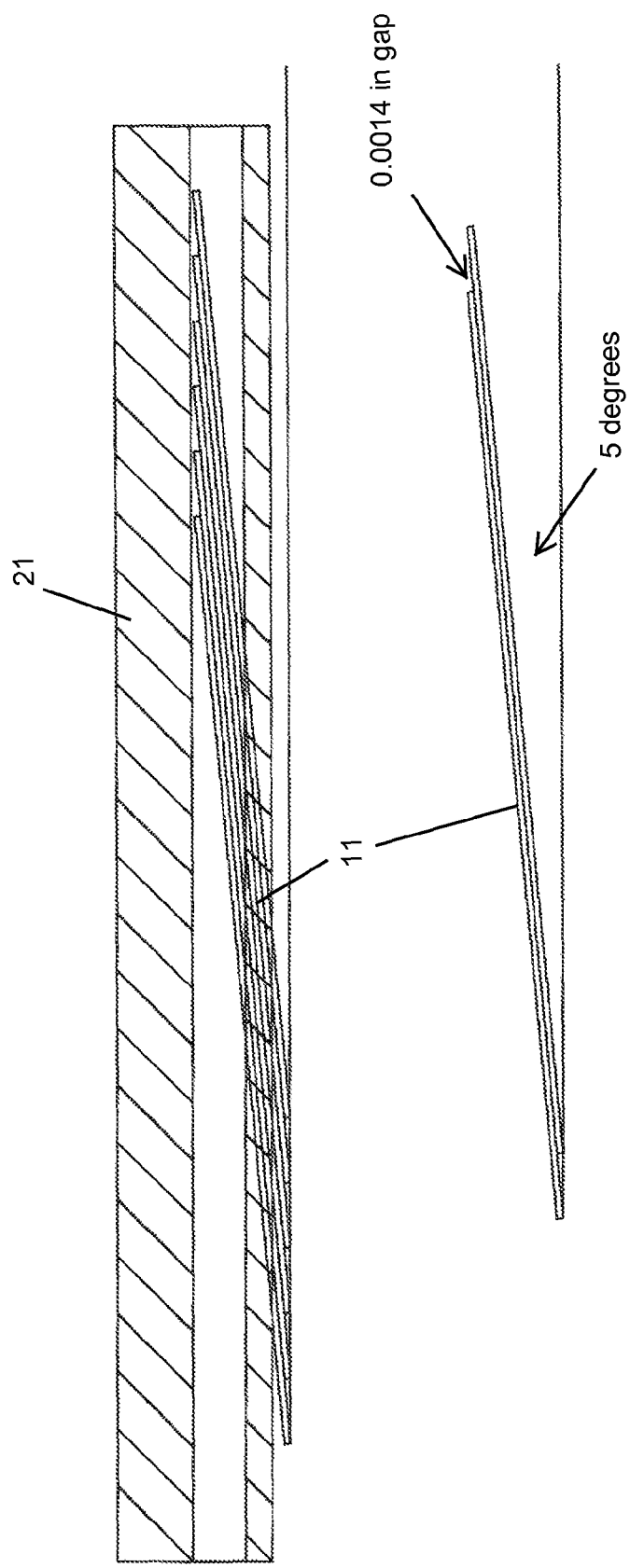
FIG. 9 shows an enlarged view of the FIG. 8 card seal arrangement.

In the first embodiment of the floating card seal shown in FIGS. 1 through 3, the individual leaf elements 11 that form the seal are the same leaf elements. Each leaf element can be formed by a punch and die stamp. FIG. 8 shows a side view of the leaf elements 11 of the floating card seal extending out from the stator 21 with the leaf elements 11 being angled at around 5 degrees from the rotational axis of the stator 21. In this embodiment, the leaf elements are around 0.7 inches in length with a spacing between adjacent tip ends 14 of around 0.06 inches. The leaf elements have a radius of around 28 inches measured from the tip ends 14. Adjacent leaf elements 11, when stacked on top of each other, form a gap of around 0.0014 inches based on a 28-inch seal radius with leaf elements 11 of around 0.005 inches in thickness. FIG. 9 shows this arrangement and FIG. 10 shows a stack of leaf elements 11 with a 5 degree slant from an axis of the stator 21.

Figure 10:
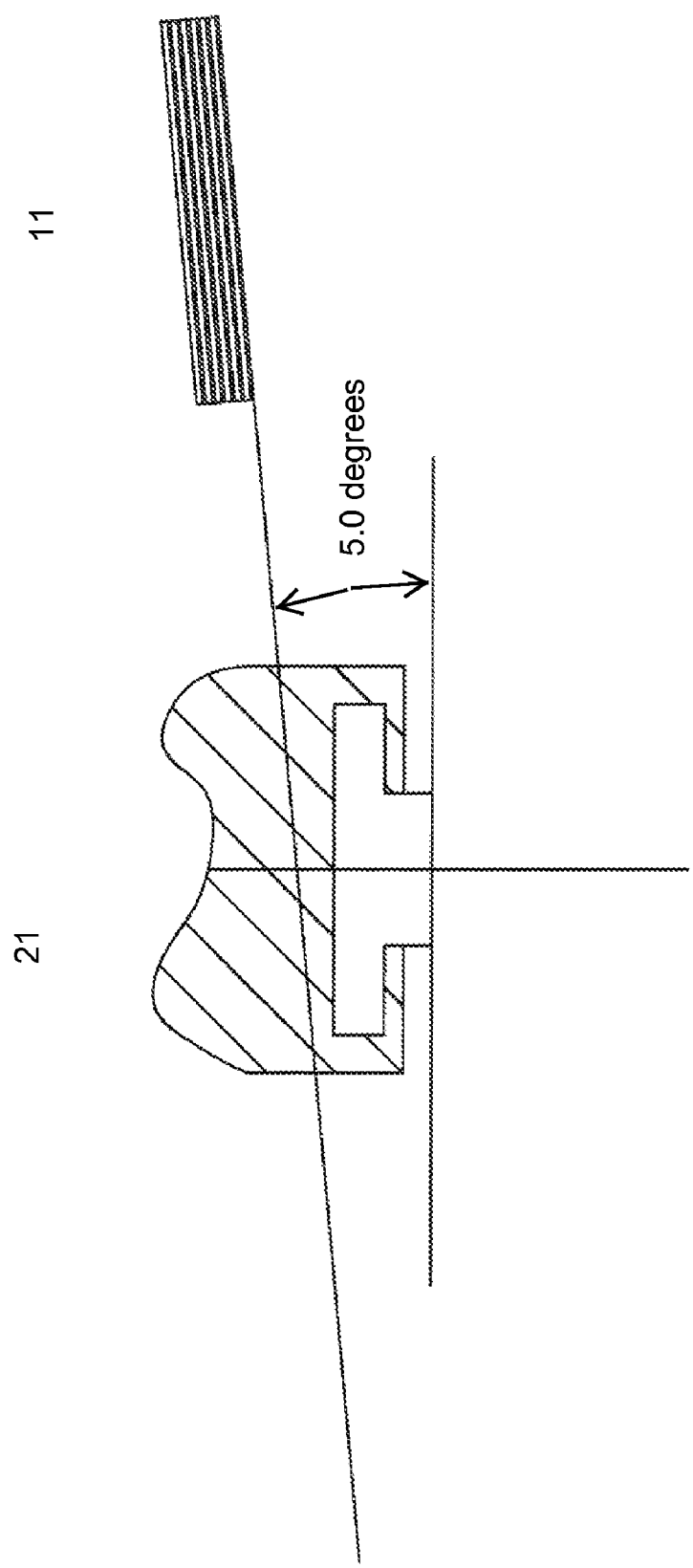
FIG. 10 shows an orientation of the stack of card seals with respect to the seal surface of the rotor of the second embodiment of the present invention.
Figure 11:
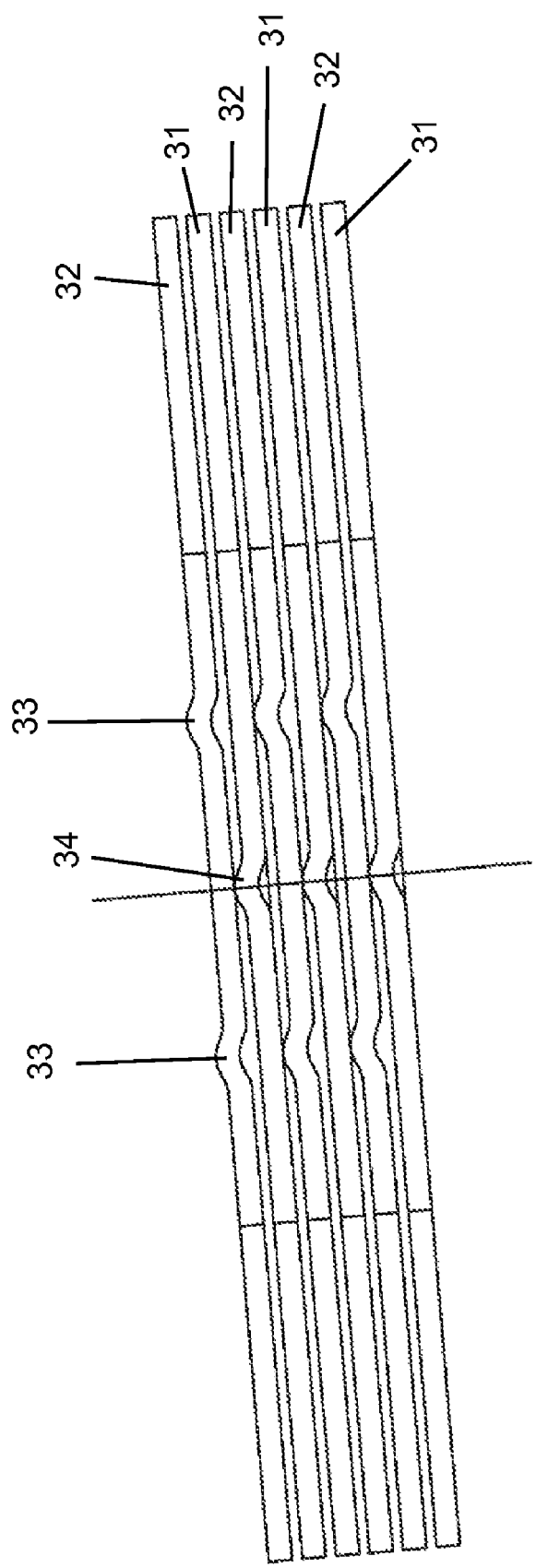
FIG. 11 shows a stack of 6 card seals of the second embodiment of the present invention.
Figure 13:
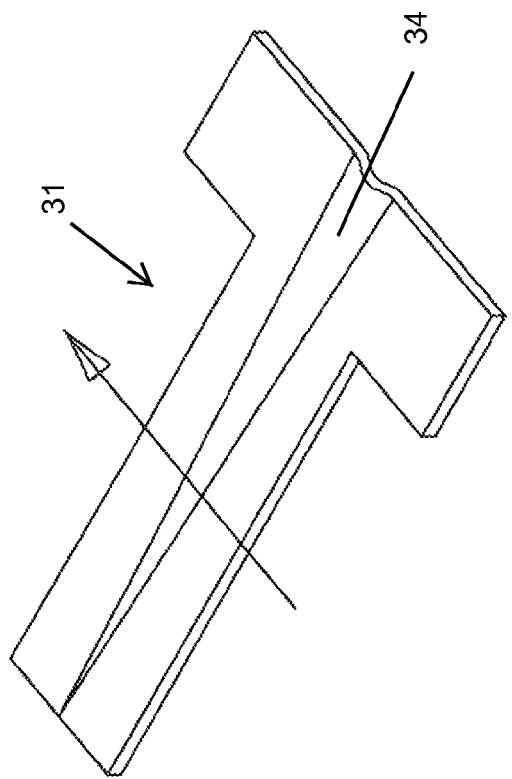
FIGS. 12 and 13 show isometric views of the two card seal arrangements for the second embodiment of the present invention.
Figure 12:
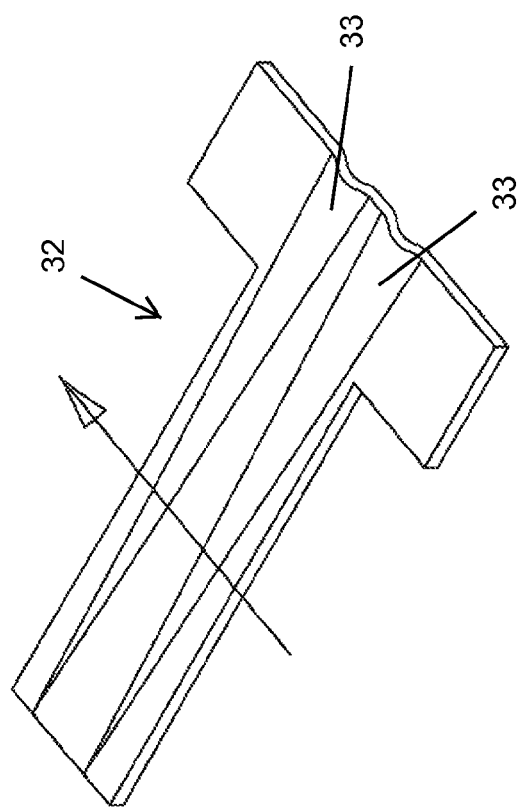

FIGS. 10 and 11 show a second embodiment of the floating card seal of the present invention in which the leaf elements that form a stack of the floating card seals is formed from two different leaf elements stacked in an alternating series. FIG. 12 shows a first leaf elements 32 with two raised portions 33 symmetric to a long axis of the leaf element 32 and FIG. 13 shows a second leaf element 31 with one raised portion 34 symmetric to the long axis of the second leaf element 31. The raised portions 33 and 34 function as the same in the first and earlier embodiment, which is to provide for a flow channel for addition fluid used to produce the air riding effect and to block any parasitic leakage across adjacent leaf elements 31 and 32.

FIG. 11 shows a cross section view of a stack of six of the leaf elements used in the second embodiment of the floating card seal of the present invention. The first leaf elements 31 are alternating with the second leaf elements 32 so that the raised portion 34 forms a flow channel along a middle of the long axis of the leaf section and the two raised portions 33 form two flow channels on both sides of the flow channel formed by the single raised portion 34. These raised portions 33 and 34 also form abutment surfaces between adjacent leaf elements 31 and 32 to block parasitic leakage across the card seal.

The leaf elements 31 and 32 of the second embodiment are stacked alternating to form a complete annular arrangement of leaf elements around the stator so that the leaf section ends form an air riding surface over the smooth surface of the rotor as in the above first embodiment. The leaf section ends can also include the slanted end surfaces of the first embodiment. FIG. 12 shows the second leaf element 32 and FIG. 13 shows the first leaf element 31.

FIGS. 14-16 show a process for treating the tip ends of the leaf elements for surface enhancement to reduce wear in a hard rub of the leaf section tip ends. A sand blaster 41 is used to project etched glass beads coated with a dry lubricant (such as graphite, moly-disulfide, etc.) to force the dry lubricant into the surface 36 of the tip ends. This process is used on all of the leaf elements that form the annular arrangement of leaf elements that form the floating card seal. FIG. 16 shows a cross section view through one leaf element with surfaces dimples in the leaf element containing the dry lubricant represented in this figure by the thin outer layer on top of the leaf element surface with the dimples. Any wear of the dry lubricant releases more dry lubricant. The dimples with impede the leakage.

FIGS. 17-19 show a process to quantify an air ride liftoff of the floating card seals of the present invention. The process includes placing one of the leaf elements (11, 31 or 32) onto a turntable rotor 51 such that the leaf element is fixed and the rotor rotates over the leaf element tip end floating surface 14. With the leaf element 11 riding on the smooth surface of the turntable rotor 51, a laser 52 directs a laser beam against a surface of the floating tip end 14 of the leaf element 11 that reflects the laser beam toward a photo pickup 53 that will measure the angle θ in order to determine when a liftoff of the leaf element 11 over the turntable rotor 51 has occurred. FIG. 18 shows applying a positive and a negative charge to the turntable rotor 51 and the leaf element 11 is order to also detect for a liftoff. When the leaf element makes contact with the surface of the turntable rotor 52, the electric circuit is closed. When a liftoff occurs, the circuit is open. This open and closed circuit can also be used to detect for a liftoff of the leaf element form the rotating surface.

We claim the following:

1. A card seal for a rotary machine, the card seal comprising:
   a stator with an annular slot to support an annular arrangement of leaf elements;
   each leaf element having a T-shaped cross sectional shape with an ear section and a leaf section;
   the leaf section having a first raised portion extending from the ear section to an end of the leaf section;
   the first raised portion forming a first air channel between adjacent leaf elements for creating an air riding seal;
   the first raised portion extends along a middle section of the leaf elements; and
   each leaf element also includes a second raised portion in the ear sections that extend from one side of the ear section to the opposite side of the ear section forming a second air channel connecting the first air channel to the second air channel.

2. The card seal of claim 1, and further comprising:
   the leaf sections each include a bent end that forms an air riding surface for the seal elements.

* * * * *